United States Patent [19]

Iwaki et al.

[11] 4,451,776

[45] May 29, 1984

[54] CHARGING GENERATOR CONTROL SYSTEM

[75] Inventors: Yoshiyuki Iwaki, Himeji; Mitsuyoshi Yokota; Akio Matsumoto, both of Hyogo, all of Japan

[73] Assignee: Mitsubishi Denki Kabushiki Kaisha, Japan

[21] Appl. No.: 497,018

[22] Filed: May 23, 1983

[30] Foreign Application Priority Data

May 31, 1982 [JP] Japan ............................. 57-81812[U]

[51] Int. Cl.³ ........................... H02P 9/10; H02P 9/14
[52] U.S. Cl. ....................................... 322/22; 322/29; 322/86; 322/60; 320/64
[58] Field of Search ....................... 322/22, 29, 86–88; 320/64, 68, 54, 56, 61

[56] References Cited

U.S. PATENT DOCUMENTS

| 3,270,267 | 8/1966 | Nolte, Jr. | 320/56 |
| 3,729,637 | 4/1973 | Gray | 320/56 X |
| 3,874,472 | 4/1975 | Deane | 320/61 X |
| 3,971,454 | 7/1976 | Waterbury | 320/56 X |
| 4,210,856 | 7/1980 | Taylor | 320/17 |

Primary Examiner—R. J. Hickey
Attorney, Agent, or Firm—Leydig, Voit, Osann, Mayer and Holt, Ltd.

[57] ABSTRACT

The present invention relates to a charging generator control system comprising a generator which includes a field winding, and an armature winding being in three-phase connection to generate an A.C. output; a rectifier which rectifies the A.C. output from said armature winding of said generator; a battery which is charged with a D.C. output from said rectifier and which can supply an exciting current to said field winding; a separately-exciting power source which generates a D.C. voltage having a magnitude independent of the generator output and which can supply an exciting current to said field winding; a voltage regulator which controls the exciting current flowing through said field winding of said generator, thereby to control the output voltage of said generator to be a predetermined value; and a switching circuit which changes-over between said battery and said separately-exciting power source, depending upon a rotating speed of said generator, a condition of a load and a capacity of said separately-exciting power source as the exciting current sources of said field winding.

7 Claims, 4 Drawing Figures

CHARGING GENERATOR CONTROL SYSTEM

BACKGROUND OF THE INVENTION

The present invention relates to a charging generator control system which is chiefly used in automobiles.

An example of a prior-art system of this type is illustrated in FIG. 1. Referring to the figure, numeral 1 designates a three-phase A.C. generator (hereinbelow, shortly termed "A.C. generator") which is installed on a vehicle or the like, not shown, to be driven by an internal combustion engine (not shown). The A.C. generator has an armature winding 101 which is in three-phase connection to generate an A.C. output, and a field winding 102. Numeral 2 designates a rectifier by which the A.C. output from the A.C. generator 1 is subjected to full-wave rectification, and which has a main rectification output terminal 201 and an auxiliary rectification output terminal 202. A voltage regulator 3 controls an exciting current flowing through the field winding 102, thereby to control the output voltage of the A.C. generator 1 to be a predetermined value. Numeral 4 denotes a key switch, numeral 5 a charging indicator lamp which is connected in series with the key switch 4, and numeral 6 a battery.

The main rectification output terminal 201 of the rectifier 2 is connected to the positive electrode side of the battery 6, the negative electrode side of which is grounded. The auxiliary rectification output terminal 202 is directly connected to the voltage regulator 3 and also through the field winding 102. In addition, the positive electrode side of the battery 6 is connected to the voltage regulator 3 through the key switch 4, the charging indicator lamp 5 and the field winding 102.

The operation of the system thus arranged will be described herebelow.

First, when the key switch 4 is closed, an initial exciting current flows through the field winding 102 along a path consisting of:

battery 6 (+)—key switch 4—charging indicator lamp 5—field winding 102—voltage regulator 3—battery 6 (−). Subsequently, when an engine has rotated, a voltage is generated in the armature winding 101 of the A.C. generator 1. When the engine has reached a predetermined rotating speed, the A.C. generator 1 starts generating electric power as a self-excited generator upon the supply of an exciting current from the auxiliary rectification output terminal 202 to the field winding 102. At the same time, an A.C. output generated in the armature winding 101 is rectified by the rectifier 2, and the battery 6 is charged with an output voltage from the main rectification output terminal 201. In addition, the voltage regulator 3 detects the voltage across the rectification output terminals and controls the exciting current flowing through the field winding 102, so that the aforementioned voltage is controlled to be a predetermined magnitude.

In such A.C. generator control systems, however, the generator is self-excited and, therefore, consumes part of its output current as the exciting current. This incurs the drawbacks that the generated output is lowered by the component of the exciting current corresponding to about 10% of the output current, and that the power of the engine is additionally consumed.

In order to solve such problems, there has been considered an expedient in which, as shown in FIG. 2, an exciting current is supplied to a field winding 102 by a separately-exciting power source 7 employing a solar cell, a thermoelectric transducer or the like. In FIG. 2, the same reference numerals as in FIG. 1 denote the same or corresponding parts, symbols 4a and 4b denote key switches, and symbols 8a and 8b denote reverse current blocking diodes which are connected in series with the respective key switches 4a and 4b. The positive electrode side of the battery 6 is connected to the voltage regulator 3 through the key switch 4a, the diode 8a and the field winding 102 in series, while one end of the separately-exciting power source 7 whose other end is grounded is connected to the voltage regulator 3 through the key switch 4b, the diode 8b and the field winding 102 in series. In addition, the auxiliary rectification output terminal 202 is connected to the voltage regulator 3, and the cathode sides of the diodes 8a and 8b are also connected to the voltage regulator 3. The separately-exciting power source 7 is so constructed that the exciting current flowing through the field winding 102 can also be supplied by the loss energy of waste heat, vibrations or the like or the natural energy of solar cells or the like.

Such charging generator control systems, however, have the disadvantage that, unless the voltage of the separately-exciting power source 7 becomes higher than the voltage of the battery 6, the exciting current is not supplied from the separately-exciting power source 7 to the field winding 102, irrespective of the rotating speed of the A.C. generator 1 and the magnitude of a load thereon.

SUMMARY OF THE INVENTION

The present invention has been made in view of the above circumstances and in order to solve such problems and eliminate such disadvantages, and has for its object to provide a charging generator control system which can increase the output of a generator and improve the efficiency thereof.

To the accomplishment of the object, the present invention disposes a separately-exciting power source besides a self-exciting power source in order to excite a field winding and switches the separately- and self-exciting power sources in accordance with the operating state of a generator, so as to effectively utilize the separately-exciting power source.

DESCRIPTION OF THE PREFERRED EMBODIMENTS

Figure 3:
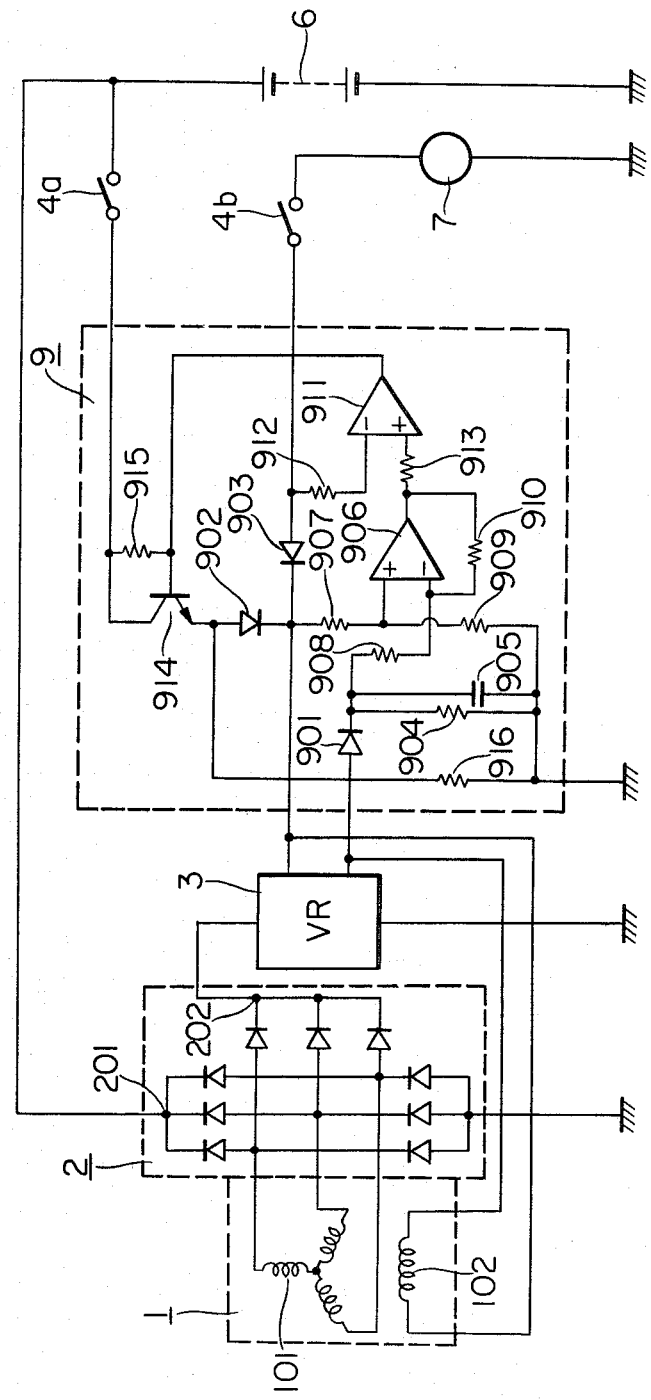
FIG. 3 is a circuit diagram showing an embodiment of a charging generator control system according to the present invention.

FIG. 3 is a circuit diagram which shows an embodiment of a charging generator control system according to the present invention, and which depicts only parts necessary for the description.

Figure 1:
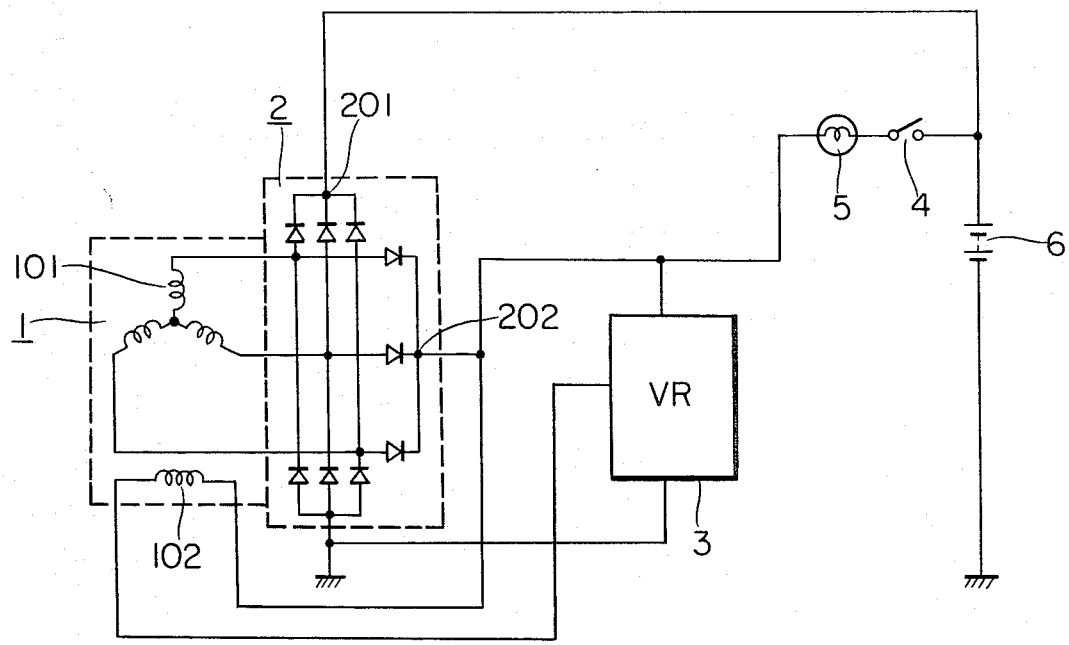
FIGS. 1 and 2 are circuit diagrams each showing an example of a charging generator control system in a prior art.
Figure 2:
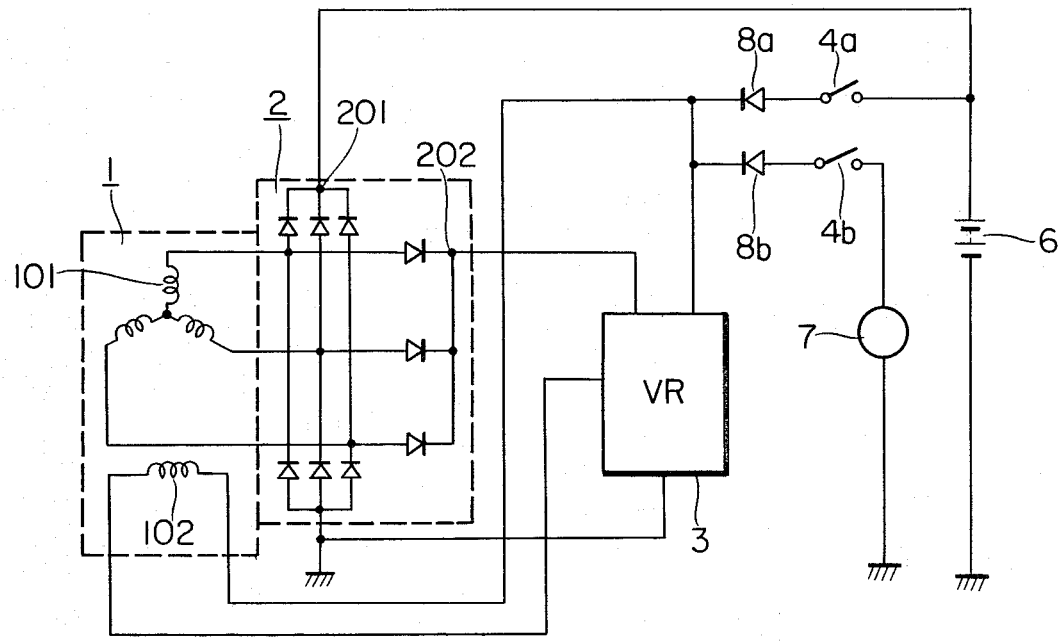

In FIG. 3, the same symbols as in FIGS. 1 and 2 denote the same or corresponding parts. Numeral 9 designates a switching circuit which changes-over between the separately-exciting power source 7 and the self-excitation owing to the battery 6 or the A.C. generator 1, depending upon the rotating speed of the A.C. generator 1, the condition of a load and the capacity of the separately-exciting power source 7. The switching circuit 9 is constructed of diodes 901, 902 and 903 for blocking reverse currents, a resistor 904 and a capacitor 905 which constitute a smoothing circuit, an operational amplifier 906, resistors 907, 908, 909 and 910, a voltage comparator 911, resistors 912 and 913, and a transistor 914 having a base resistor 915 and an emitter resistor 916, which is a main switching element.

The noninverting input end (+) of the operational amplifier 906 is connected to the node of the cathode sides of the diodes 902 and 903 through the resistor 907 and is also grounded through the resistor 909, the inverting input end (−) thereof is connected to the voltage regulator 3 through the resistor 908 and the diode 901 in series, and the output end thereof is connected to the inverting input end (−) through the resistor 910. The operational amplifier 906 and the resistors 907–910 constitute a substractor circuit. The node of the diode 901 and the resistor 908 is grounded through the resistor 904 and the capacitor 905 in parallel.

On the other hand, the noninverting input end (+) of the voltage comparator 911 is connected to the output end of the operational amplifier 906 through the resistor 913, while the inverting input end (−) thereof is connected through the resistor 912 to the anode side of the diode 903 and also to one end of the key switch 4b whose other end is connected to the separately-exciting power source 7. Here, the resistors 912 and 913 are resistors for limiting input currents. The collector of the transistor 914 forming the main switching element is connected to the positive electrode side of the battery 6 through the key switch 4a, the emitter thereof is connected to the anode side of the diode 902 and is also grounded through the resistor 916, and the base thereof is connected to the collector through the resistor 915 and also to the output end of the voltage comparator 911.

One end of the field winding 102 is connected to the voltage regulator 3 and also to the node among the diodes 902, 903 and the resistor 907 of the switching circuit 9, while the other end thereof is connected to the voltage regulator 3 and also to the anode side of the diode 901 of the switching circuit 9.

Now, the operation of the embodiment shown in FIG. 3 will be described. First, when the key switches 4a and 4b are closed, an exciting current flows through the field winding 102 along the following path, subject to the condition that the voltage of the separately-exciting power source 7 is higher than the voltage of the battery 6:

(1) separately-exciting power source 7—key switch 4b—diode 903—field winding 102—voltage regulator 3—separately-exciting power source 7. . . . (1)

In contrast, subject to the condition that the voltage of the separately-exciting power source 7 is lower than the voltage of the battery 6, and exciting current flows through the field winding 102 along the following path:

(2) battery 6 (+)—key switch 4a—transistor 914—diode 902—field winding 102—voltage regulator 3—battery 6 (−). . . . (2)

Subsequently, when an engine rotates, an A.C. voltage is generated in the armature winding 101 of the A.C. generated in the armature winding 101 of the A.C. generator 1, and it is rectified by full-wave rectification by means of the rectifier 2. The voltage regulator 3 detects the voltage of the auxiliary rectification output terminal 202, and controls the exciting current flowing through the field winding 102, so as to control the output voltage of the A.C. generator 1 to be a predetermined value.

An exciting voltage required for causing this exciting current to flow is found by detecting the voltage across the field winding 102. More specifically, in the embodiment shown in FIG. 3, the smoothing circuit is constructed of the resistor 904 and the capacitor 905, and the subtractor circuit is constructed of the resistors 907–910 and the operational amplifier 906, the output of which serves as the exciting voltage. Herein, when the output voltage of the operational amplifier 906 is lower than the voltage of the separately-exciting power source 7, the output of the voltage comparator 911 becomes its low ("L") level. Accordingly, the transistor 914 falls into the nonconductive state, and the exciting current flows through the path (1). Conversely, when the output voltage of the operational amplifier 906 is higher than the voltage of the separately-exciting power source 7, the output of the voltage comparator 911 becomes its high "H" level, and the transistor 914 shifts into the conductive state. Accordingly, the exciting current flows through the path (2).

In this manner, the present invention switches between the self-exciting power source and the separately-exciting power source 7, which supplies the exciting current to the field winding of the generator by the use of a solar cell, a thermoelectric transducer, or the like, as a function of the rotating speed of the generator, the condition of the load, and the capacity of the separately-exciting power source 7. Thus, the separately-exciting power source 7 can be effectively utilized.

Figure 4:
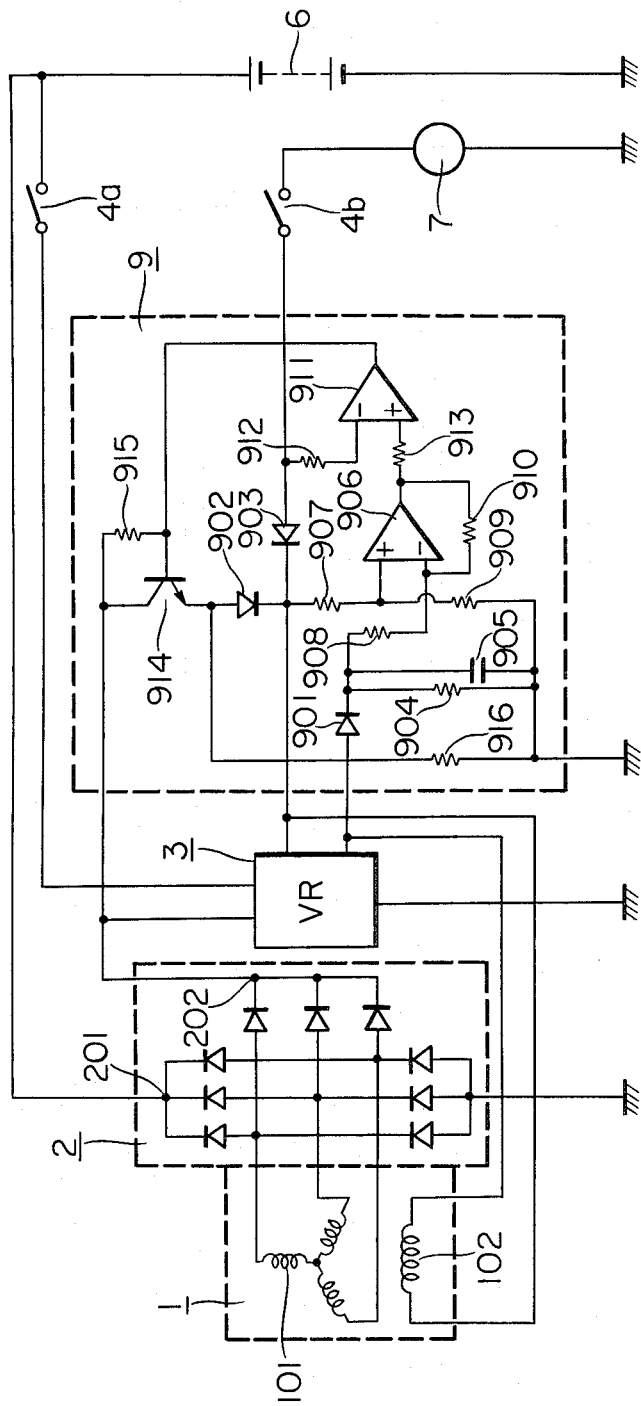
FIG. 4 is a circuit diagram showing another embodiment of the present invention.

FIG. 4 is a circuit diagram which shows another embodiment of the present invention, and which illustrates only parts necessary for the description thereof. In the embodiment shown in FIG. 3, the exciting current is supplied from the battery 6 when the voltage of the separately-exciting power source 7 is lower, whereas in this embodiment of FIG. 4, it is supplied from the side of the A.C. generator 1.

In FIG. 4, the same parts as in FIG. 3 are assigned the same symbols, and they will not be repeatedly explained. The positive electrode side of the battery 6 is connected to the voltage regulator 3 through the key switch 4a. The auxiliary rectification output terminal 202 of the rectifier 2 is connected to the voltage regulator 3, and is also connected to the collector of the transistor 914 forming the main switching element.

Now, the operation of the embodiment shown in FIG. 4 will be described. First, in a case where the output voltage of the operational amplifier 906 is lower than the voltage of the separately-exciting power source 7, the transistor 914 falls into the nonconductive state and the exciting current flows through the path (1), in the same manner as in the foregoing embodiment shown in FIG. 3. Secondly, in a case where the output voltage of the operational amplifier 906 is higher than the voltage of the separately-exciting power source 7, namely, where the voltage of the separately-exciting power source 7 is lower, the transistor 914 shifts into the conductive state, and the exciting current flows through the path of:

auxiliary rectification output terminal 202—transistor 914—diode 902—field winding 102—voltage regulator 3.

Thus, this embodiment shown in FIG. 4 achieves an effect similar to that of the foregoing embodiment shown in FIG. 3.

As set forth above, according to the present invention, a self-exciting power source and a separately-exciting power source which supplies an exciting current to the field winding of a generator by the use of a solar cell, a thermoelectric transducer, or the like, are switched therebetween depending upon the rotating speed of the generator, the condition of a load and the capacity of the separately-exciting power source, whereby this separately-exciting power source can be effectively utilized, so that the effect of the invention in practical use is very great. The invention is also very effective in the points that the output of the generator can be increased and that the efficiency thereof can be improved.

What is claimed is:

1. A charging generator control system comprising:
   a generator which includes a field winding, and an armature winding being in three-phase connection to generate an A.C. output;
   a rectifier which rectifies the A.C. output from said armature winding of said generator;
   a battery which is charged with a D.C. output from said rectifier and which can supply an exciting current to said field winding;
   a separately-exciting power source which generates a D.C. voltage having magnitude independent of the generator output and which can supply an exciting current to said field winding;
   a voltage regulator which controls the exciting current flowing through said field winding of said generator, thereby to control the output voltage of said generator to be a predetermined value; and
   a switching circuit which changes-over between said battery and said separately-exciting power source, depending upon a rotating speed of said generator, a condition of a load and a capacity of said separately-exciting power source, as the exciting current sources of said field winding.

2. A charging generator control system according to claim 1, wherein said separately-exciting power source is a D.C. power source which is obtained by converting loss energy, such as of waste heat or vibrations, into electric power energy.

3. A charging generator control system according to claim 1, wherein said separately-exciting power source is constructed of a solar cell.

4. A charging generator control system according to claim 1, wherein said switching circuit comprises:
   a smoothing circuit as well as an operational amplifier which detects a voltage across said field winding;
   a comparator which compares an output voltage of said operational amplifier with the voltage of said separately-exciting power source; and
   a semiconductor switching element which is connected to said battery and whose conduction is controlled by an output of said comparator.

5. A charging generator control system comprising:
   a generator which includes a field winding, and an armature winding being in three-phase connection to generate an A.C. output;
   a rectifier which rectifies the A.C. output from said armature winding of said generator;
   a battery which is charged with a D.C. output from said rectifier;
   a separately-exciting power source which generates a D.C. voltage having a magnitude independent of the generator output and which can supply an exciting current to said field winding;
   a voltage regulator which controls the exciting current flowing through said field winding of said generator, thereby to control the output voltage of said generator to be a predetermined value; and
   a switching circuit which changes-over between said separately-exciting power source and a self-exciting power source being the output of said rectifier, depending upon a rotating speed of said generator, a condition of a load and a capacity of said separately-exciting power source.

6. A charging generator control system according to claim 5, wherein said rectifier comprises:
   a main rectifier portion and an auxiliary rectifier portion, wherein an output terminal of said main rectifier portion is connected to said battery, while an output terminal of said auxiliary rectifier portion is connected to said voltage regulator and said switching circuit.

7. A charging generator control system according to claim 6, wherein said switching circuit comprises:
   a smoothing circuit as well as an operational amplifier which detects a voltage across said field winding;
   a comparator which compares an output voltage of said operational amplifier with the voltage of said separate-exciting power source; and
   a semiconductor switching element which is connected to said output terminal of said auxiliary rectifier portion and whose conduction is controlled by an output of said comparator.

* * * * *